(12) United States Patent
Mochizuki et al.

(10) Patent No.: US 6,354,421 B1
(45) Date of Patent: Mar. 12, 2002

(54) BRAKE SYSTEM IN BUGGY

(75) Inventors: Kikuo Mochizuki, Shizuoka; Shinji Satou; Akikazu Ohno, both of Hamamatsu, all of (JP)

(73) Assignee: Shin Nippon Wheel Industries Co., Ltd., Shizuoka (JP)

( * ) Notice: Subject to any disclaimer, the term of this patent is extended or adjusted under 35 U.S.C. 154(b) by 13 days.

(21) Appl. No.: 09/635,870

(22) Filed: Aug. 10, 2000

(51) Int. Cl.[7] ................................................ B60T 1/06
(52) U.S. Cl. ........................ 192/218; 188/71.5; 188/71.6
(58) Field of Search ........................ 192/218; 188/71.5, 188/72.7, 71.6, 106 P; 180/370, 244; 475/230; 74/411.5

(56) References Cited

U.S. PATENT DOCUMENTS

| | | | |
|---|---|---|---|
| 4,114,479 A | * | 9/1978 | Ashfield ................. 192/218 X |
| 4,377,094 A | * | 3/1983 | Thompson et al. ..... 188/71.6 X |
| 5,673,776 A | | 10/1997 | Fitch et al. |
| 6,182,800 B1 | * | 2/2001 | Mochizuki et al. ........ 199/71.5 |

FOREIGN PATENT DOCUMENTS

| | | |
|---|---|---|
| JP | 61-152524 | 9/1986 |
| JP | 61-229650 | * 10/1986 |

* cited by examiner

Primary Examiner—Rodney H. Bonck
(74) Attorney, Agent, or Firm—Arent Fox Kintner Plotkin & Kahn, PLLC

(57) ABSTRACT

A brake system in a buggy includes first and second brake shafts which are disposed on one side of the left and right differential output shafts in a longitudinal direction of the vehicle and in parallel to the left and right differential output shafts and which are driven at increased speeds by the left and right differential output shafts. The first and second brake shafts and the first and second brakes are accommodated within a reduction case, so that the first and second brakes are cooled by lubricating oil within the reduction case. Thus, the brake system in the buggy can be mounted at a high level above the ground; is excellent in dustproof and waterproof properties; is cooled satisfactorily, and moreover, is capable of reliably braking left and right wheels simultaneously.

8 Claims, 8 Drawing Sheets

BRAKE SYSTEM IN BUGGY

BACKGROUND OF THE INVENTION

1. Field of the Invention

The present invention relates to a brake system for braking front wheels or rear wheels in a buggy which is used for traveling mainly on an unleveled ground, in particular, in a buggy including a differential driving shaft connected to a propelling shaft, a pair of left and right differential output shafts connected to left and right wheel driving shafts, respectively, a differential mechanism for distributing power to the left and right differential output shafts, while being driven from the differential driving shaft, and a reduction case which has the diferential mechanism accommodated therein and supports the differential driving shaft and the left and right output shafts.

2. Description of the Related Art

There are conventionally known brake systems in such type of buggies, including (1) one which has a multi-plate brake mounted between a differential driving shaft and a reduction case supporting the differential driving shaft to brake the differential driving shaft (see U.S. Pat. No. 5,673,776, and (2) another which has a drum brake mounted on each of wheels (for example, see Japanese Utility Model Application Laid-open No.61-152524).

The buggy is used in many cases to travel on an unleveled ground and hence, it is required that the brake system for the buggy be disposed with its level set as high as possible above the ground, so that it will not contact projections on the ground surface to the utmost. Dust-proof and waterproof properties capable of preventing the entering of the earth, sand and muddy water are also required and further, a cooling property enabling the brake system to withstand the severe braking is required. Of course, it is also necessary in stabilizing the braking attitude of the vehicle to be able to apply braking forces equally to the left and right wheels, regardless of the presence of the differential mechanism.

However, the multi-plate brake of the brake system (1) described above is on the differential driving shaft which is located at a relatively high level above the ground. Therefore, it is possible to ensure the level of the brake system above the ground, but because of an arrangement that the braking force is applied in a divided manner to the left and right wheel driving shafts by the differential mechanism, there may be cases wherein the braking force cannot be applied equally to both the wheels depending on a difference between the frictional resistances the left and right wheels receive from the ground surface. The drum brake of the brake system (2) must be formed at a large diameter in order to provide a large braking force and for this reason, it is difficult to ensure a level above the ground and moreover, it is necessary to provide special dust-proof and water-proof means for the structure of the drum brake.

SUMMARY OF THE INVENTION

Accordingly, it is an object of the present invention to provide a brake system in a buggy, wherein the problems associated with the conventionally known brake systems can be overcome, and all the above-described requirements and necessities can be satisfied.

To achieve the above object, according to a first aspect and feature of the present invention, there is provided a brake system in a buggy comprising a differential driving shaft connected to a propelling shaft, a pair of left and right differential output shafts connected to left and right wheel driving shafts, respectively, a differential mechanism for distributing power to the left and right differential output shafts, while being driven from the differential driving shaft, and a reduction case which has the differential mechanism accommodated therein and supports the differential driving shaft and the left and right output shafts, wherein the brake system comprises first and second brake shafts driven at increased speeds by the left and right differential output shafts, and first and second brakes capable of applying braking forces to the first and second brake shafts, respectively, the first and second brake shafts and the first and second brakes being disposed within the reduction case, such that the first and second brakes are cooled by lubricating oil in the reduction case.

With the above first feature, the first and second brakes are accommodated in the reduction case and hence, even during traveling of the buggy, it is possible to easily and reliably prevent the earth, sand and muddy water from entering into the brake system by the reduction case. Moreover, the first and second brakes can be cooled by lubricating oil in the reduction case, leading to an enhancement of the durability of the brakes.

In addition, the first and second brake shafts are driven at increased speeds from the left and right differential output shafts. Therefore, large braking torque can be applied to left and right front wheels with relatively small braking torques applied to the first and second brake shafts by the first and second brakes. In addition, it is possible to reduce the sizes of the brakes by reducing the loads on the brakes, and the level of the reduction case covering the brakes above the ground can be ensured to provide an excellent travelability of the buggy on an unleveled ground.

According to a second aspect and feature of the present invention, in addition to the first feature, each of the brakes is comprised of a plurality of rotary brake friction plates axially slidably retained on the corresponding brake shaft, a plurality of stationary brake friction plates superposed alternately on the rotary brake friction plates and axially slidably retained on the reduction case, and a brake actuator for urging the pluralities of rotary and stationary brake friction plates in an axial direction.

With the second feature, the load of each of the rotary and stationary brake friction plates can be reduced effectively. Therefore, the diameter of the brake device can be further reduced, and even if the first and second brake shafts are disposed in front and in the rear of the left and right differential output shafts, the level of the reduction case covering the brake devices above the ground can be ensured sufficiently.

According to a third aspect and feature of the present invention, in addition to the first feature, the first and second brakes are provided with a common brake actuator capable of actuating the first and second brakes with equivalent actuating forces.

With the third feature, equivalent braking forces can be applied simultaneously to the left and right wheels and moreover, the use of the common brake actuator can contribute to the simplification of the structure.

According to a fourth aspect and feature of the present invention, in addition to the second feature, the pluralities of rotary and stationary brake friction plates of the first and second brakes are disposed coaxially, and the brake system includes stationary pressure-receiving portions for receiving outer portions of the rotary and stationary brake friction plates, and a common brake actuator disposed between the rotary and stationary brake friction plates and capable of urging the rotary and stationary brake friction plates to the corresponding pressure-receiving portions with equivalent urging forces.

With the fourth feature, the pluralities of rotary and stationary brake friction plates of the first and second brakes can be clamped simultaneously by the single brake actuator, leading to a simplified arrangement.

According to a fifth aspect and feature of the present invention, in addition to any of the first to fourth features, the first and second brakes are disposed on a front side of the vehicle with respect to the left and right differential output shafts.

With the fifth feature, the lubricating oil stored in the reduction case is moved forwards by inertia and supplied in a large amount to the brake system upon braking during traveling of the vehicle. Thus, the brake system can be cooled effectively by the oil under the aid of travel wind, leading to a further excellent durability provided to the brake system.

According to a sixth aspect and feature of the present invention, in addition to any of the first to fourth features, the first and second brake shafts are disposed in parallel to the left and right differential output shafts, respectively, and coaxially with each other.

With the sixth feature, the first and second brakes can be accommodated compactly in the reduction case.

According to a seventh aspect and feature, in addition to the sixth feature, the diameters of the first and second brakes are smaller than the largest diameter of a reduction mechanism which interconnects the differential driving shaft and the differential mechanism.

With the seventh feature, it is possible to avoid the increase in size of the reduction case having the first and second brakes accommodate therein by reducing the diameters of the first and second brakes, thereby easily ensuring the level of the case above the ground.

The above and other objects, features and advantages of the invention will become apparent from the following description of the preferred embodiment taken in conjunction with the accompanying drawings.

DESCRIPTION OF THE PREFERRED EMBODIMENT

The present invention will now be described by way of a preferred embodiment with reference to the accompanying drawings.

Figure 1:
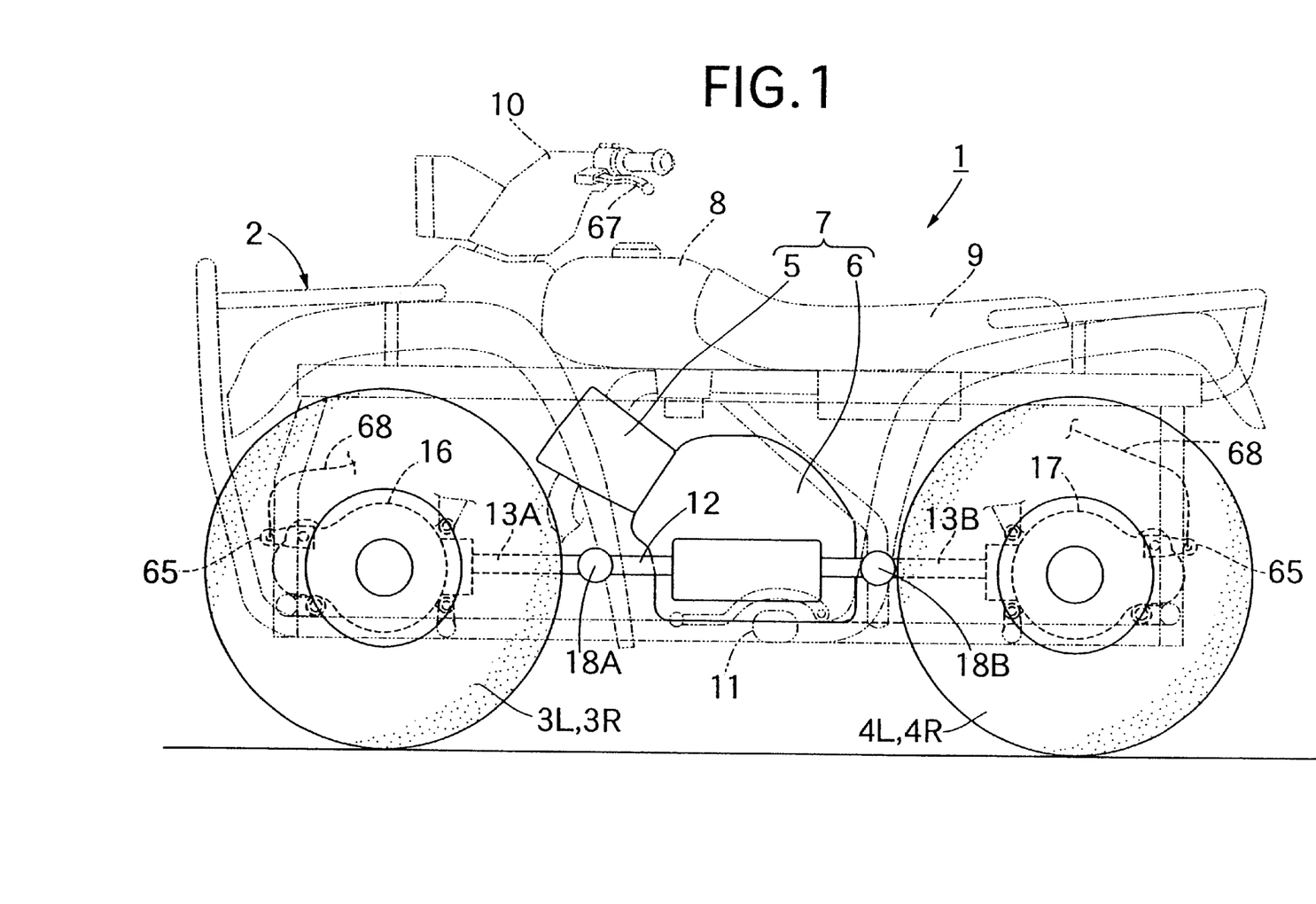
FIG. 1 is a schematic side view of a buggy provided with a brake system according to the present invention.
Figure 2:
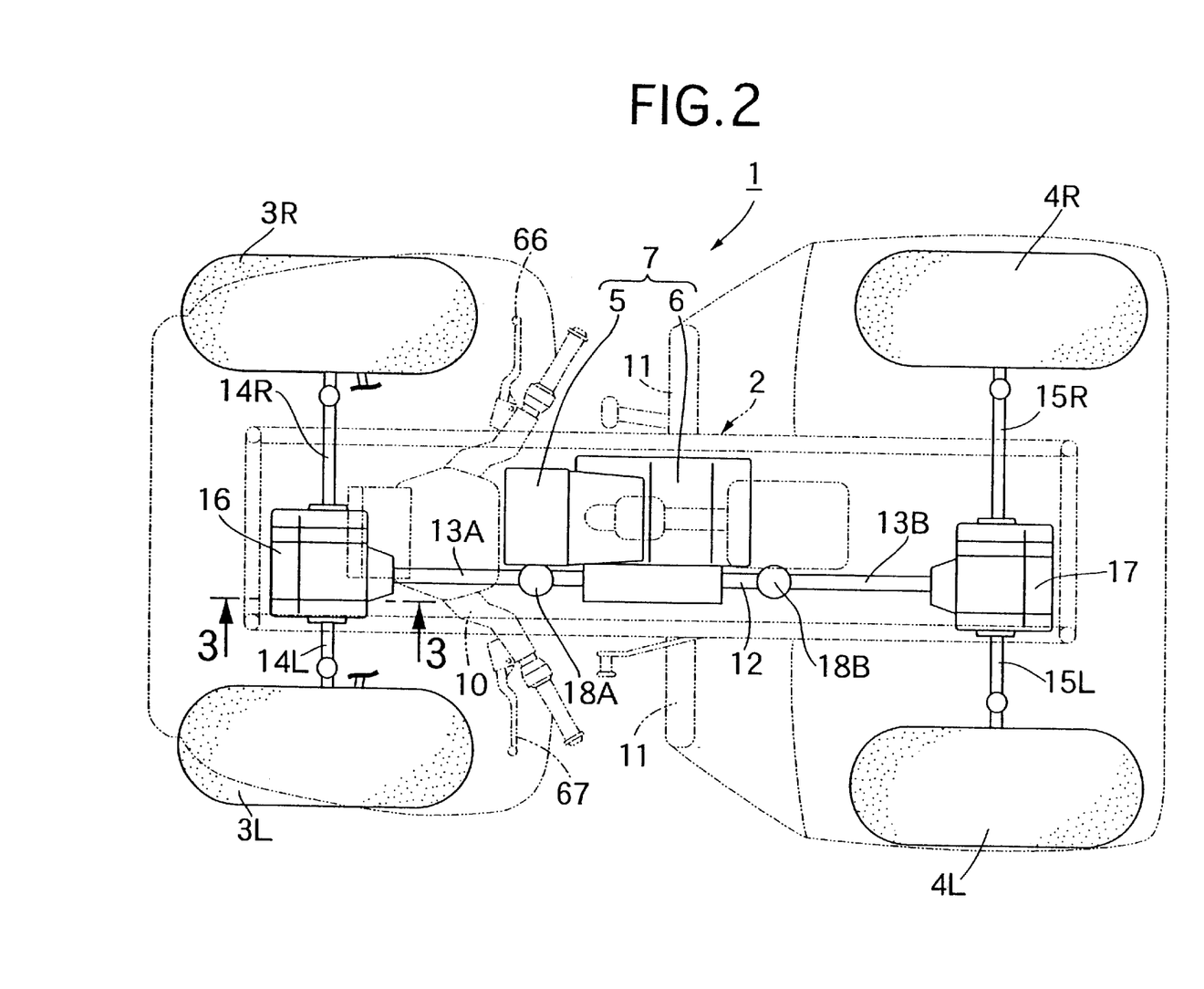
FIG. 2 is a schematic plan view of the buggy.

First, in FIGS. 1 and 2, reference numeral 1 designates a buggy. A pair of left and right front wheels 3L and 3R and a pair of left and right rear wheels 4L and 4R are vertically movably mounted at front and rear portions of a vehicle body frame 2 of the buggy through suspensions, respectively. A wide low-pressure type tire generally referred to as a balloon tire is mounted on each of the wheels 3 and 4. A power unit 7 comprising an engine 5 and a transmission 6 is mounted at a central portion of the vehicle body frame 2. A fuel tank 8 and a seat 9 are disposed above the power unit 7, and a steering handlebar 10 for steering the front wheels 3L and 3R is disposed in front of the fuel tank 8. A pair of left and right steps 11, 11 are provided below the power unit 7. Therefore, the buggy 1 is designed such that a user sits astride the seat 9 and steers the buggy with his two feet put on the steps 11, 11.

The power unit 7 includes an output shaft 12 which is disposed substantially horizontally with opposite ends thereof turned in a longitudinal direction of the vehicle, and front and rear propelling shafts 13A and 13B are connected to the front and rear ends of the output shaft 12 through universal joints 18A and 18B, respectively. The front propelling shaft 13A is connected to a pair of front wheel driving shafts 14L and 14R connected to the left and right front wheels 3L and 3R, through a reduction mechanism and a differential mechanism within a front reduction case 16. The rear propelling shaft 13B is connected to a pair of rear wheel driving shafts 15L and 15R connected to the left and right rear wheels 4L and 4R, through a reducing mechanism and a differential mechanism within a rear reduction case 17. Brake devices for braking the front wheels 3L and 3R and the rear wheels 4L and 4R are accommodated in the front and rear reduction cases 16 and 17, respectively. The front and rear reduction cases 16 and 17 are mounted at the front and rear portions of the vehicle body frame 2, respectively.

The reducing mechanisms, the differential mechanisms and the brake devices within the front and rear reduction cases 16 and 17 are of the basically same arrangements and hence, mainly, the reducing mechanism, the differential mechanism and the brake device in the front reduction case 16 will be described below with reference to FIGS. 3 to 9.

Figure 4:
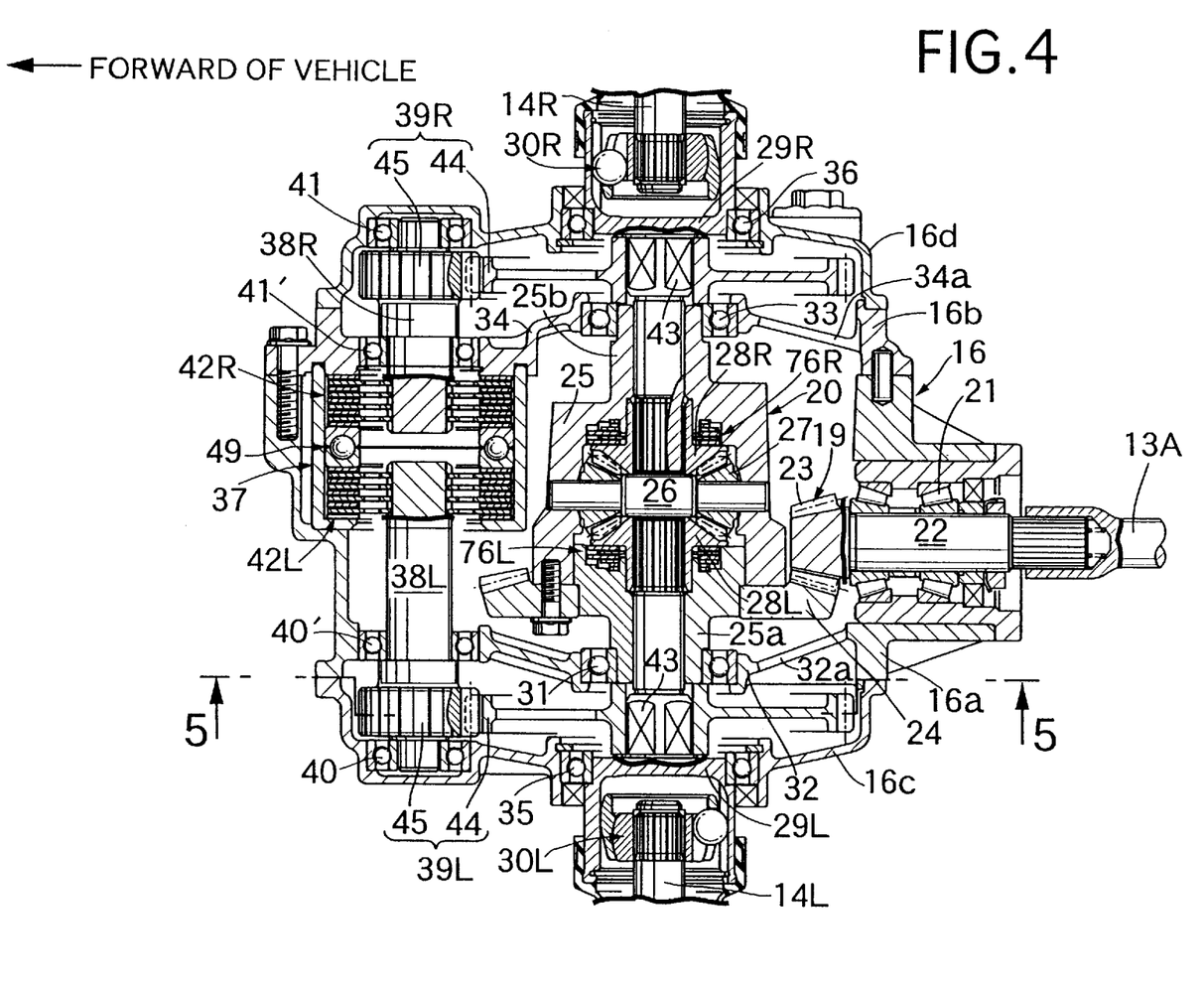
FIG. 4 is a sectional view taken along a line 4—4 in FIG. 3.
Figure 5:
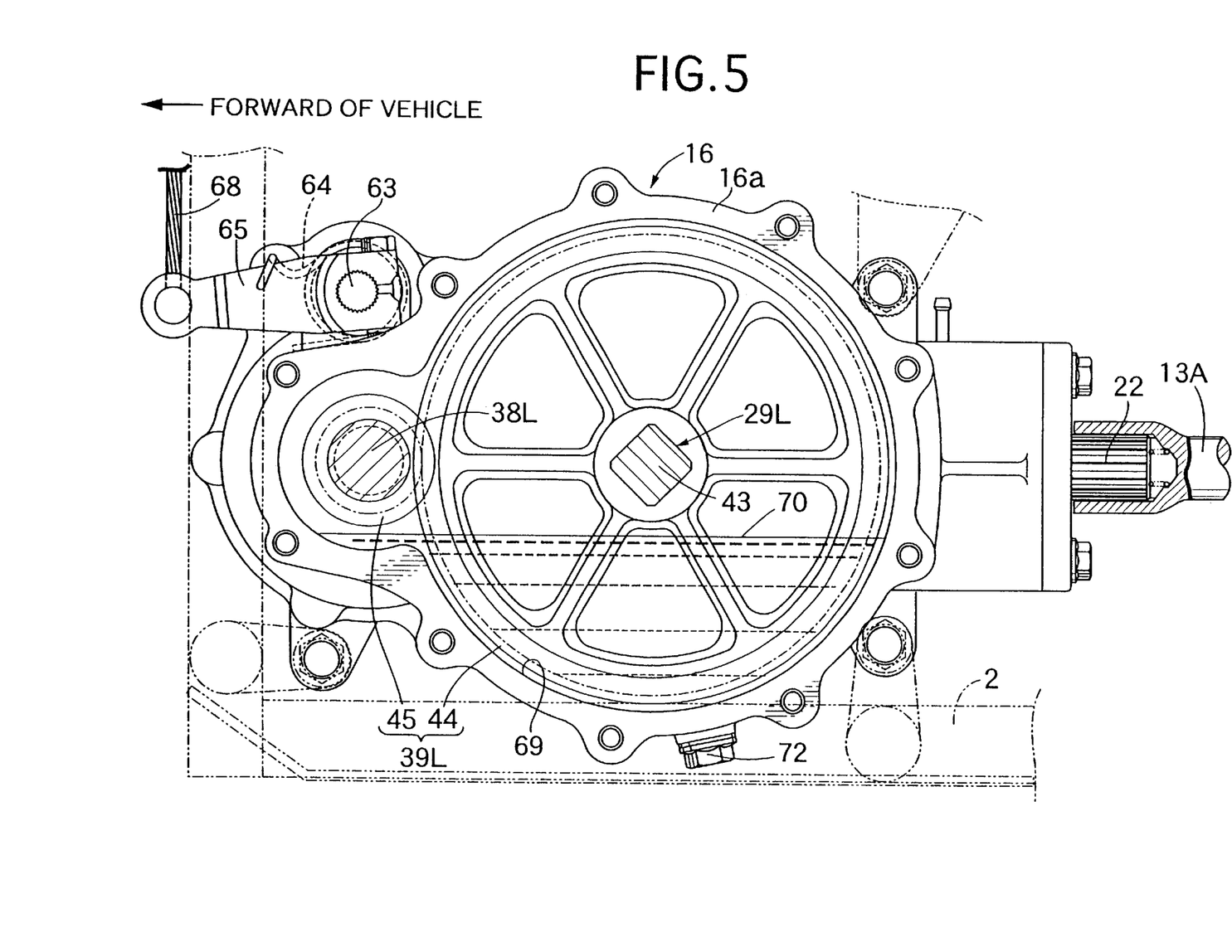
FIG. 5 is a sectional view taken along a line 5—5 in FIG. 4.

First, as shown in FIG. 4, the reducing mechanism 19 is comprised of a differential driving shaft 22 carried in the front reduction case 16 through a bearing 21 and spline-coupled to the front propelling shaft 13A, a reducing pinion 23 formed on the differential driving shaft 22, and a reducing ring gear 24 meshed with the reducing pinion 23 within the front reduction case 16 and secured to a differential carrier 25 which will be described hereinafter, so that the differential carrier 25 is driven with a reduction in speed from the differential driving shaft 22.

The differential mechanism 20 has a known arrangement comprising a differential carrier 25, a spider 26, a plurality of differential pinions 27 and a pair of left and right side gears 28L and 28R. The front wheel driving shafts 14L and 14R are connected through ball-type even-speed joints 30L and 30R to left and right differential output shafts 29L and 29R spline-coupled to the left and right side gears 28L and 28R, respectively.

The front reduction case 16 is comprised of a central body 16a supporting the differential driving shaft 22, a left side-cover 16c bolted to a left end face of the central body 16a, an intermediate body 16b bolted to a right end face of the central body 16a, and a right side-cover 16d bolted to an outer end face of the intermediate body 16b. The central body 16a is integrally formed at its left end with a bracket wall 32 which supports a left shaft portion 25a of the differential carrier 25 through a bearing 31, and the intermediate body 16b is integrally formed with a bracket wall 34 which supports a right shaft portion 25b of the differential carrier 25 through a bearing 33. The left and right differential output shafts 29L and 29R are supported on the left and right side-covers 16a and 16d through bearings 35 and 36, respectively. The bracket walls 32 and 34 are provided with through-bores 32a and 34a, respectively, which enable a lubricating oil to be introduced and discharged therethrough.

Friction devices 76L and 76R each comprising a plurality of friction plates and a leaf spring are provided between the left and right side gears 28L and 28R and the differential carrier 25, respectively, so that the side gears 28L and 28R are not operated differentially, unless the frictional resistance of the left and right front wheels 3L and 3R on a ground surface exceeds a predetermined value.

Figure 3:
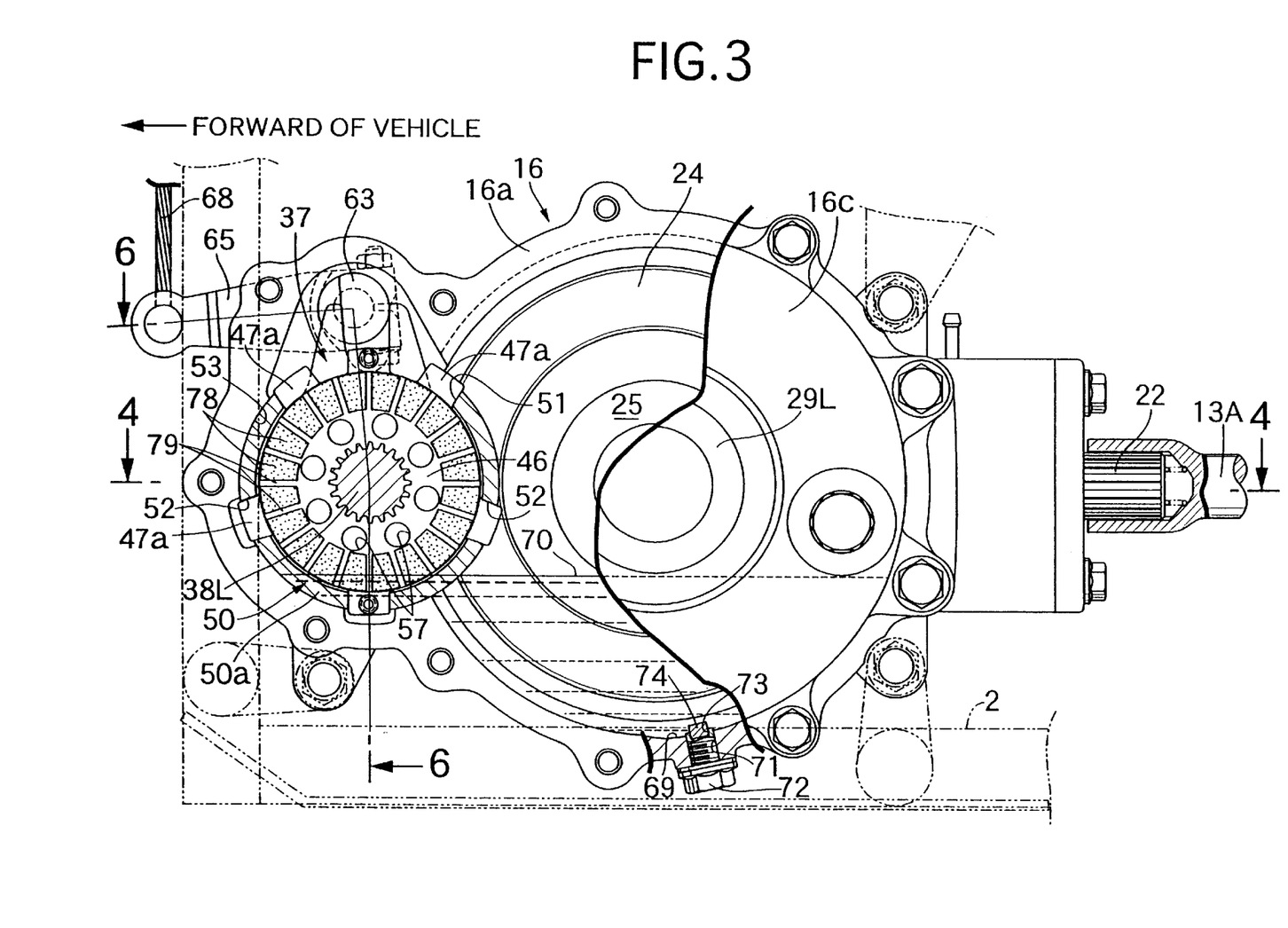
FIG. 3 is a sectional view taken along a line 3—3 in FIG. 2.

The brake device 37, as shown in FIGS. 3 to 4, is comprised of a first brake shaft 38L arranged in parallel to the left differential output shaft 29L, a second brake shaft 38R arranged in parallel to the right differential output shaft 29R and coaxially with the first brake shaft 38L, a first speed-increase mechanism 39L for driving the first brake shaft 38L with an increase in speed from the left differential output shaft 29L, a second speed-increase mechanism 39R for driving the second brake shaft 38R with an increase in speed from the right differential output shaft 29R, a first brake 42L capable of providing a braking force to the first brake shaft 38L, and a second brake 42R capable of providing a braking force to the second brake shaft 38R.

In this case, the brake shafts 38L and 38R are disposed adjacent the sides of the differential output shafts 29L and 29R, which are on the front side of the vehicle.

The first brake shaft 38L is carried on the left side-cover 16c and the bracket wall 32 with bearings 40 and 40' interposed therebetween, and the second brake shaft 38R is carried on the right side-cover 16d and the intermediate body 16d with bearings 41 and 41' interposed therebetween.

The first speed-increasing mechanism 39L is disposed between the bracket wall 32 and the left side-cover 16c, and the second speed-increasing mechanism 39R is disposed between the intermediate body 16b and the right side-cover 16d. Each of the seed-increasing mechanisms 39L and 39R is comprised of a larger-diameter driving gear 44 fitted over an intermediate rectangular shaft portion 43 of the corresponding differential output shaft 29L, 29R, and a smaller-diameter driven gear 45 formed on the corresponding brake shaft 38L, 38R and meshed with the driving gear 44.

Each of the first and second brakes 42L and 42R includes a plurality of rotary brake friction plates 46 slidably spline-fitted over the corresponding brake shaft 38L, 38R, a plurality of stationary brake friction plates 47 superposed alternately on the rotary brake friction plates 46 and axially movably retained on the front reduction case 16, and a brake actuator 49 capable of urging the rotary and stationary brake friction plates 46 and 47 in an axial direction. Each of the rotary and stationary brake friction plates 46 and 47 is formed at a diameter smaller than the reduction gear 24 having the largest diameter within the front reduction case 16. A plurality of oil flow-through holes 57 are provided in each of the rotary brake friction plates 46, so that the lubricating oil flows through the oil flow-through holes 57 to cool the rotary brake friction plates 46.

Figure 6:
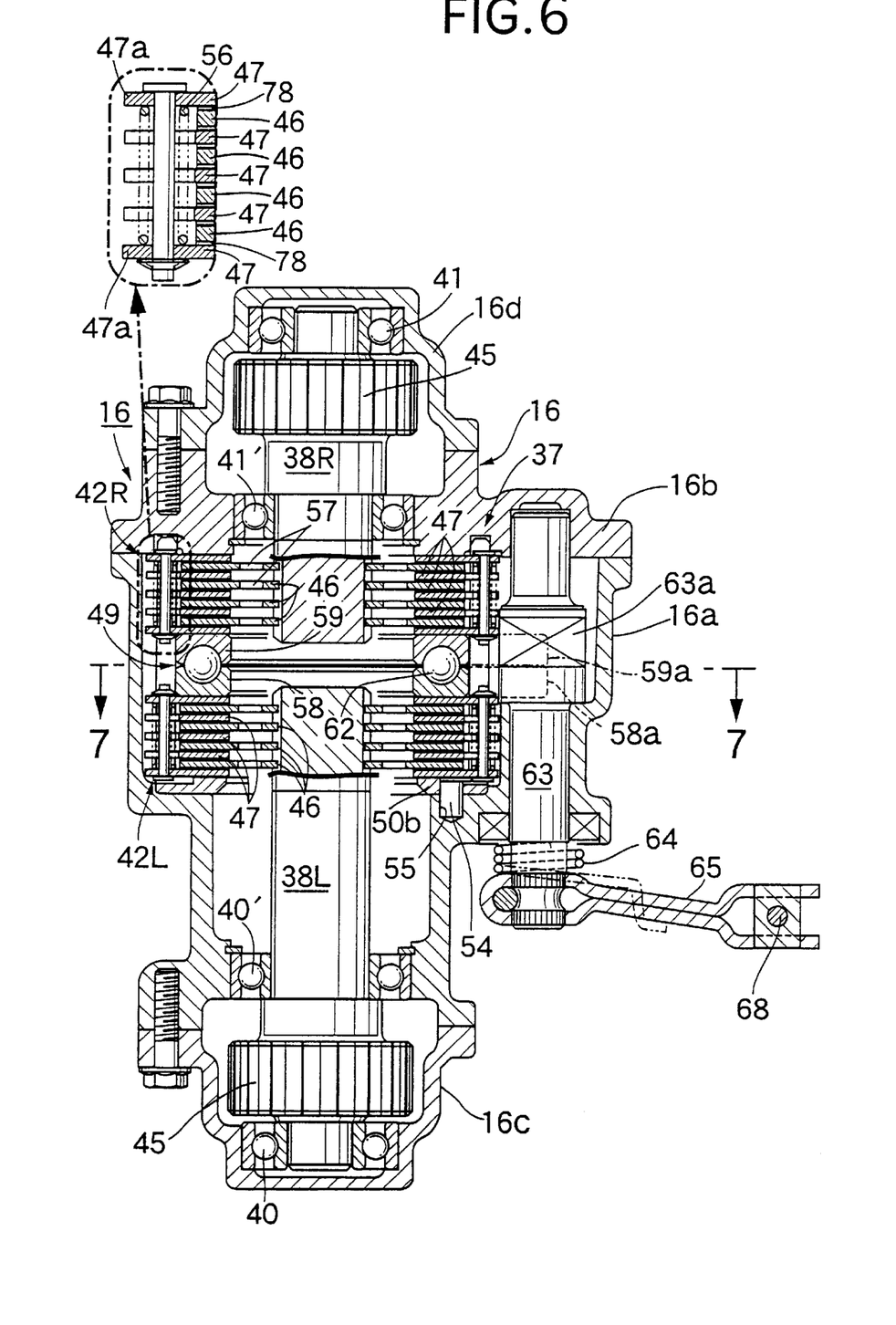
FIG. 6 is a sectional view taken along a line 6—6 in FIG. 3.

As shown in FIGS. 3 and 6, friction linings 78 having radiate oil grooves 79 are bonded to opposite surfaces of the rotary brake friction plates 47, but such friction linings 78 may be provided on the rotary brake friction plates 46.

Figure 9:
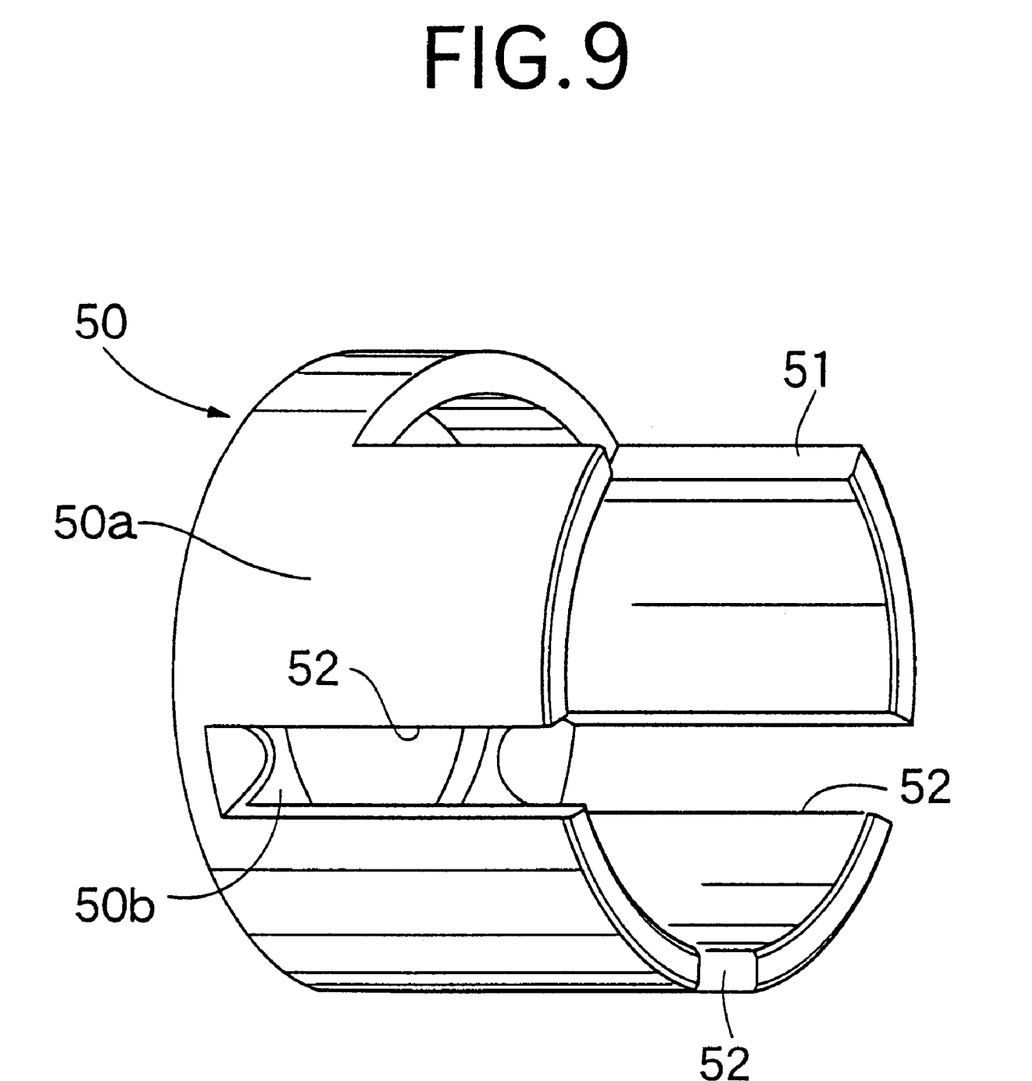
FIG. 9 is a perspective view of a brake cage.

The rotary and stationary brake friction plates 46, 47 and 46, 47 of the brakes 42L and 42R are accommodated in a common brake cage 50 secured to the central body 16a. The brake cage 50 comprises a cylindrical circumferential wall 50a, and an annular end wall 50b formed integrally at one end of the circumferential wall 50a, as shown in FIGS. 3, 6 and 9. The circumferential wall 50a has a single wide notch 51 which opens into an end face opposite from the end wall 50b, and a plurality of narrow notches 52. The brake cage 50 is fitted, with the wide notch 51 turned upwards, over a major arc-shaped housing 53 formed on an inner periphery of a front portion of the central body 16a. Then, the brake cage 50 is clamped in an axial direction between an inner end wall of the housing 53 and the intermediate body 16b by fitting a positioning pin 54 projectingly provided on the end wall 50b of the brake cage 50 into a positioning bore 55 provided in an inner end wall of the housing 53. In this manner, the brake cage 50 is secured to the front reduction case 16.

A plurality of transmitting claws 47a projectingly provided around an outer periphery of each of all the stationary brake friction plates 47 of the first and second brakes are slidably fitted into the wide notch 51 and the narrow notches 52 in the brake cage 50. In this manner, all the stationary friction plates 47 are axially movably but unrotatably supported on the brake cage 50.

In the rotary and stationary brake friction plate groups 46 and 47 of each of the brakes 42L and 42R, the two stationary brake friction plates 47, 47 are disposed on opposite sides, and a coil-shaped release spring 56 (see FIG. 6) is interposed between the transmitting claws 47a, 47a of the two stationary friction plates 47, 47 for biasing the transmitting claws 47a, 47a away from each other.

Figure 7:
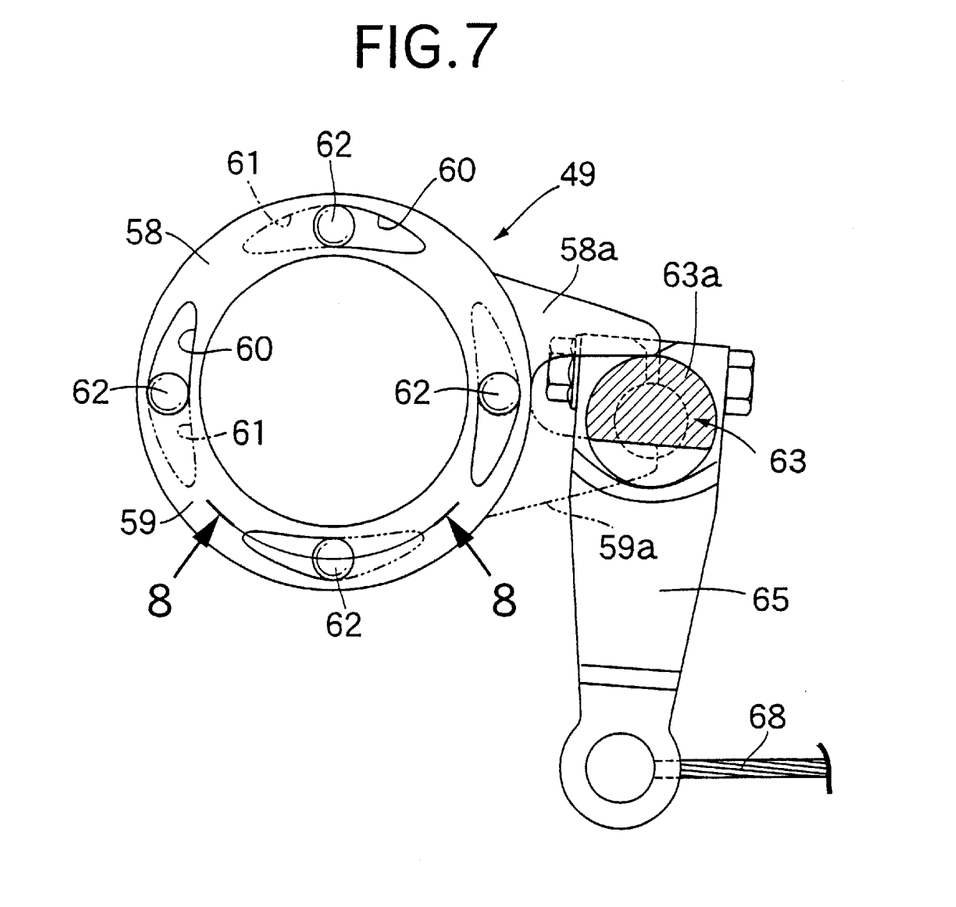
FIG. 7 is a sectional view taken along a line 7—7 in FIG. 6.
Figure 8:
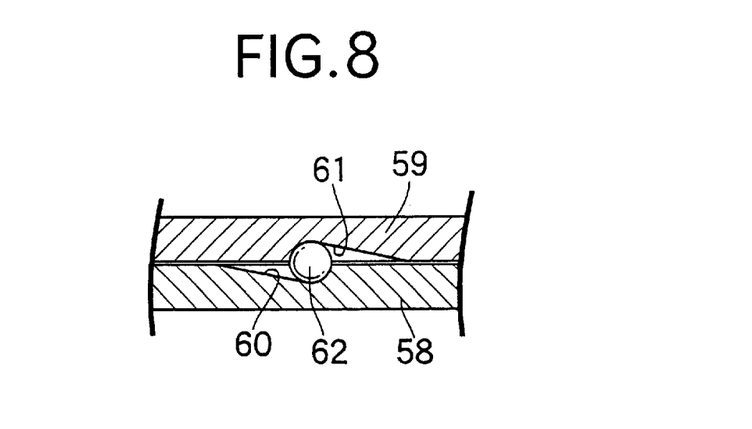
FIG. 8 is a sectional view taken along a line 8—8 in FIG. 7.

As shown in FIGS. 6 to 8, the brake actuator 49 is disposed between the rotary and stationary brake friction plate groups 46 and 47 to actuate the first and second brakes 42L and 42R simultaneously. More specifically, the brake actuator 49 includes a pair of cam plates 58 and 59 which are interposed between the rotary and stationary brake friction plate groups 46 and 47; 46 and 47 of both the brakes 42L and 42R and which are rotatably and slidably fitted to an inner peripheral surface of the circumferential wall 50a of the brake cage 50, and a plurality of sets of cam grooves 60 and 61 which are defined circumferentially in opposed surfaces of the cam plates 58 and 59 and opposed to each other to form a pair, and balls 62 each of which is brought into the cam grooves 60 and 61 in each of the sets. The cam grooves 60, 61 in each set extend circumferentially of the cam plates 58 and 59, and are formed such that their bottoms become shallower as they go to ends opposite from each other. In a usual state, the deepest portions of the cam grooves 60 and 61 are opposed to each other with the ball 62 put therebetween, and the cam plates 58 and 59 are put in proximity to each other. However, when the cam plates 58 and 59 are rotated relative to each other in directions such that their shallower portions are opposed to each other, the cam plates 58 and 59 are urged away from each other by a thrust generated on the ball 62.

In this case, the end wall 50b of the brake cage 50 serves as a pressure-receiving portion to receive the outer stationary brake friction plates 47 of the first brake 42L, and the intermediate body 16b also serves as a pressure-receiving portion to receive the outer stationary brake friction plates 47 of the second brake 42R.

The cam plates 58 and 59 have an arms 58a and 59a extending upwards through the wide notch 51 of the brake cage 50, and a half moon-shaped cam portion 63a of the cam shaft 63 rotatably carried in the front reduction case 16 is interposed between the arms 58a and 59a. When the camshaft 63 is rotated in an operating direction, the arms 58a and 59a are opened, so that the cam plates 58 and 59 are rotated relative to each other, as described above.

The camshaft 63 protrudes, at its end opposite from the cam portion 63a, out of the front reduction case 16, and an operating lever 65 is secured to such end. The operating lever 65 is connected through a brake cable 68 to a front brake lever 66 pivotally supported at a right end of the steering handlebar 10 (see FIG. 2). A return spring 64 is connected to the operating lever 65 for biasing the operating lever 65 in a non-operating direction.

Referring again to FIG. 3, a lower portion of the front reduction case 16 is formed as an oil reservoir 39, and a lubricating oil 70 is filled in the oil reservoir 39 up to a defined level in which the reduction mechanism 19, the differential mechanism 20 and portions of the rotary and stationary brake friction plate groups 46 and 47; 46 and 47 of the brakes 42L and 42R are immersed in the lubricating oil 70. A drain bolt 72 is threadedly inserted into a drain bore 71 opening into a bottom of the oil reservoir 39 to close the drain bore 71. A permanent magnet 74 is accommodated in a recess 73 defined in an inner end of the drain bolt 72 to attract an iron powder in the lubricating oil stored in the oil reservoir 39.

The reduction mechanism 19, the differential mechanism 20 and the brake device 37 having arrangements similar to those described above are also disposed in the rear reduction case 17. In this case, the differential driving shaft 22 is disposed on the front side of the vehicle, and the brake device 37 is disposed on the rear side of the vehicle, so that the differential output shafts 29L and 29R are sandwiched between the differential driving shaft 22 and the brake device 37. A rear brake lever 67 (see FIG. 2) for operating the brake device 37 is pivotally supported at a left end of the steering handlebar 10.

The operation of this embodiment will be described below.

When the front brake lever 66 of the steering handlebar 10 is operated to pull the brake cable 68 during traveling of the buggy 1, the operating lever 65 is turned against the biasing force of the return spring 64 to rotate the camshaft 63 in the operating direction. Then, the half moon-shaped cam portion 63a of the camshaft 63 forces the arms 58a and 59a of the first and second cam plates 58 and 59 open, thereby the rotating the cam plates 58 and 59 relative to each other. Therefore, the ball 62 interposed between the cam plates 58 and 59 causes the cam plates 58 and 59 to be moved away from each other by interactions of the ball 62 and the cam grooves 60 and 61. As a result, the first cam plate 58 urges the rotary and stationary brake friction plates 46 and 47 of the first brake 42L relative to the end wall 50b of the brake cage 50, so that a braking torque is generated by the friction between the adjacent rotary and stationary brake friction plates 46 and 47. The braking torque is transmitted through the first brake shaft 38L, the first speed-increasing mechanism 39L, the left differential output shaft 29L and the left front wheel driving shaft 14L to the left front wheel 3L to brake the left front wheel 3L. The second cam plate 59 urges the rotary and stationary brake friction plates 46 and 47 of the second brake 42R relative to the intermediate body 16b, so that a braking torque is generated by the friction between the adjacent rotary and stationary brake friction plates 46 and 47. The braking torque is transmitted through the second brake shaft 38R, the second speed-increasing mechanism 39R, the right differential output shaft 29R and the right front wheel driving shaft 14R to the right front wheel 3R to brake the right front wheel 3R.

Moreover, the entire cam plates 58 and 59 are axially slidable within the brake cage 50. Therefore, if a difference is generated between thrusts applied to the cam plates 58 and 59, the entire cam plates 58 and 59 are displaced to the smaller thrust to balance the thrusts with each other. In this manner, the braking forces can be applied equally to the left and right front wheels 3L and 3R simultaneously by the operation of the single brake actuator 49.

If the operating force is released from the front brake lever 66, the operating lever 65 is retracted toward the non-operative position under the action of the biasing force of the return spring 64, and in response to this, the first and second cam plates 58 and 59 are moved toward each other, while being rotated in a direction opposite from the above-described direction. Therefore, in the rotary and stationary brake friction plate groups 46 and 47 of each of the brakes 42L and 42R, the stationary brake friction plates 47, 47 on the opposite sides are moved away from each other by the resilient force of the release spring 56 and hence, no drag is brought about between the rotary and stationary brake friction plate, whereby the rotation of the brake shafts 38L and 38R is not impeded. Therefore, the left and right front wheels 3L and 3R can be released from the braked states. In addition, the first and second brake shafts 39L and 38R driven respectively by the left and right differential output shafts 29L and 29R are independent from each other and hence, the differential operations of the differential output shafts 29L and 29R are permitted.

The brake device 37 is accommodated in the front reduction case 16 and hence, even during traveling of the buggy on an unleveled ground, it is possible easily and reliably to prevent the earth, sand and muddy water from entering into the brake device by the front reduction case 16. Moreover, the first and second brakes 42L and 42R are partially immersed in the lubricating oil 70 within the front reduction case 16 and exposed to the lubricating oil scattered by the rotation of the differential mechanism 20 and hence, it is possible to achieve the lubrication of the brake actuator 49 and the cooling of the rotary and stationary brake friction plates 46 and 47 of the brakes 42L and 42R. In this case, the opposed surfaces of both the brake friction plates 46 and 47 can be cooled effectively, particularly, by the oil passed through the radiate oil grooves 79 in the friction linings 78 bonded to the rotary brake friction plates 46 or the stationary brake friction plates 47.

In addition, the first and second brake shafts 38L and 38R are driven with the increase in speed through the first and second speed-increasing mechanism 39L and 39R from the left and right differential output shafts 29L and 29R. Therefore, large braking torques can be applied to the left and right front wheels 3L and 3R with relatively small braking torques applied to the first and second brake shafts 38L and 38R by the first and second brakes 42L and 42R. In addition, the rotary and stationary brake friction plates 46 and 47 of each of the brakes 42L and 42R are of a multi-plate construction and hence, the loads of the rotary and stationary brake friction plates 46 and 47 can be reduced effectively. Therefore, it is possible reduce the size of the brake device 37 by reducing the diameters of the rotary and stationary brake friction plates 46 and 47 to a level smaller than that of the reduction ring gear 24. Thus, even if the first and second brake shafts 38L and 38R are disposed in front and in the rear of the left and right differential output shafts 29L and 29R, the level of the front reduction case 16 covering the brake device 37 above the ground can be ensured sufficiently to provide an excellent travelability on an unleveled ground.

In this case, particularly, if the brake device 37 is disposed on the front side of both the differential output shafts 29L and 29R, the lubricating oil 70 stored in the oil reservoir 69 in the front reduction case 16 can be moved forwards by an inertia and supplied in a large amount to the brake device 37 upon the braking operation during traveling of the vehicle. Therefore, the brake device 37 can be cooled effectively by the oil under the aid of travel wind, whereby the durability of the brake device 37 can be enhanced largely. Thus, this arrangement is extremely effective for application to the front wheel brake device 37 with a particularly large load.

If the rear brake lever 67 on the steering handlebar 10 is operated, the brake device within the rear reduction case 17 can be operated in the same manner as described above to apply braking forces to the left and right rear wheels 4L and 4R.

Although the embodiment of the present invention has been described in detail, it will be understood that the present invention is not limited to the above-described embodiment, and various modifications in design may be made without departing from the spirit and scope of the invention defined in claims. For example, the brake actuator 49 may be constructed into a hydraulically operated type.

What is claimed is:

1. A brake system in a buggy comprising a differential driving shaft connected to a propelling shaft, a pair of left and right differential output shafts connected to left and right wheel driving shafts, respectively, a differential mechanism for distributing power to said left and right differential output shafts, while being driven from said differential driving shaft, and a reduction case which has said differential mechanism accommodated therein and supports said differential driving shaft and said left and right output shafts, wherein said brake system comprises first and second brake shafts driven at increased speeds by the left and right differential output shafts, and first and second brakes capable of applying braking forces to said first and second brake shafts, respectively, said first and second brake shafts and said first and second brakes being disposed within said reduction case, such that said first and second brakes are cooled by lubricating oil in said reduction case.

2. A brake system in a buggy according to claim 1, wherein each of said brakes is comprised of a plurality of rotary brake friction plates axially slidably retained on the corresponding brake shaft, a plurality of stationary brake friction plates superposed alternately on said rotary brake friction plates and axially slidably retained on said reduction case, and a brake actuator for urging said pluralities of rotary and stationary brake friction plates in an axial direction.

3. A brake system in a buggy according to claim 2, wherein said pluralities of rotary and stationary brake friction plates of said first and second brakes are disposed coaxially, and the brake system includes stationary pressure-receiving portions for receiving outer portions of said rotary and stationary brake friction plates, and a common brake actuator disposed between the rotary and stationary brake friction plate and capable of urging said rotary and stationary brake friction plates to the corresponding pressure-receiving portions with equivalent urging forces.

4. A brake system in a buggy according to claim 1, wherein said first and second brakes are provided with a common brake actuator capable of actuating said first and second brakes with equivalent actuating forces.

5. A brake system in a buggy according to any one of claims 1 to 4, wherein said first and second brakes are disposed on a front side of the vehicle with respect to said left and right differential output shafts.

6. A brake system in a buggy according to any of claims 1 to 4, wherein said first and second brake shafts are disposed in parallel to said left and right differential output shafts, respectively, and coaxially with each other.

7. A brake system in a buggy according to claim 6, wherein the diameters of said first and second brakes are smaller than the largest diameter of a reduction mechanism which interconnects said differential driving shaft and said differential mechanism.

8. A brake system in a buggy comprising a differential driving shaft connected to a propelling shaft, a pair of left and right differential output shafts connected to left and right wheel driving shafts, respectively, a differential mechanism for distributing power to said left and right differential output shafts, while being driven from said differential driving shaft, and a reduction case which has said differential mechanism accommodated therein and supports said differential driving shaft and said left and right output shafts, wherein said brake system comprises first and second brake shafts which are disposed on one side of said left and right differential output shafts in a longitudinal direction of the vehicle and in parallel to said left and right differential output shafts, said first and second brake shafts being driven at increased speeds by said left and right differential output shafts, respectively, and first and second brakes capable of applying braking forces to said first and second brake shafts, respectively, said first and second brake shafts and said first and second brakes being accommodated within said reduction case, each of said brakes being comprised of a plurality of rotary brake friction plates axially slidably retained on the corresponding brake shaft, a plurality of stationary brake friction plates superposed alternately on said rotary brake friction plates and axially slidably retained on said reduction case, and a brake actuator for urging said pluralities of rotary and stationary brake friction plates in an axial direction.

* * * * *